United States Patent
Bauman (10) Patent No.: US 10,131,254 B2
(45) Date of Patent: *Nov. 20, 2018

(54) SEAT SUSPENSION

(71) Applicant: Alan Bauman, Pine River, MN (US)

(72) Inventor: Alan Bauman, Pine River, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/628,565

(22) Filed: Jun. 20, 2017

(65) Prior Publication Data

US 2017/0283012 A1  Oct. 5, 2017

Related U.S. Application Data (60) Division of application No. 14/744,975, filed on Jun. 19, 2015, now Pat. No. 9,707,874, which is a
(Continued)

(51) Int. Cl.
*B60N 2/52*   (2006.01)
*B63B 29/00*  (2006.01)
(Continued)

(52) U.S. Cl.
CPC .............. *B60N 2/525* (2013.01); *B60N 2/14* (2013.01); *B60N 2/502* (2013.01); *B60N 2/507* (2013.01);
(Continued)

(58) Field of Classification Search
CPC ... B63B 2029/043; B63B 29/12; B63B 29/00; B63B 29/04; B60N 2/522; B60N 2/525; B60N 2/52; B60N 2/501; B60N 2/502; B60N 2/505; B60N 2/508; F16F 9/049; F16F 2222/126; F16F 9/04; F16F 9/08; B60G 17/0485; B60G 2202/242
(Continued)

(56) References Cited

U.S. PATENT DOCUMENTS

| | | | |
|---|---|---|---|
| 2,832,586 A * | 4/1958 | Grudin | F16F 9/08 267/121 |
| 3,168,278 A | 2/1965 | Ogden | |

(Continued)

OTHER PUBLICATIONS

GoodYear, Engineered Product Airsprings-1S3-013 Brochure, (C) 2008, 2 pages.

*Primary Examiner* — Ingrid M Weinhold
(74) *Attorney, Agent, or Firm* — Faegre Baker Daniels LLP (57) ABSTRACT

A seat suspension includes a seat support, a base, and a suspension assembly positioned between the seat support and the base. The suspension assembly includes a compressible cushion for containing a gas; and a chamber. The chamber includes a cylindrical hollow member, a front cap at one end of the cylindrical hollow member, an end cap at another end of the cylindrical hollow member, and a piston positioned within the cylindrical hollow member between the front cap and the end cap. The front cap includes an orifice. The orifice provides fluid communication between the cushion and the chamber. When a compressive force causes movement of the seat support portion towards the base, thereby compressing the cushion, the gas from the cushion flows through the orifice into the chamber and directly forces movement of the piston away from the front cap.

20 Claims, 10 Drawing Sheets

Related U.S. Application Data continuation of application No. 14/213,787, filed on Mar. 14, 2014, now Pat. No. 9,120,410.

(60) Provisional application No. 61/784,659, filed on Mar. 14, 2013.

(51) Int. Cl.
 *B63B 29/04* (2006.01)
 *B60N 2/50* (2006.01)
 *B60N 2/14* (2006.01)
 *F16F 9/04* (2006.01)

(52) U.S. Cl.
 CPC .............. *B60N 2/522* (2013.01); *B63B 29/00* (2013.01); *B63B 29/04* (2013.01); *B63B 2029/043* (2013.01); *F16F 9/04* (2013.01); *F16F 9/049* (2013.01)

(58) Field of Classification Search
 USPC ....... 248/622, 631, 566, 636, 564, 421, 550; 267/64.11, 64.23, 64.27, 64.19, 64.28, 267/64.25, 64.26, 131, 133, 142; 114/363; 188/297, 298, 313, 318, 322.1
 See application file for complete search history.

(56) References Cited

U.S. PATENT DOCUMENTS

| | | | |
|---|---|---|---|
| 3,628,763 A | 12/1971 | Auer | |
| 3,667,707 A | 6/1972 | Mui | |
| 3,682,431 A * | 8/1972 | Vivian | A47C 7/14 248/631 |
| 3,989,232 A | 11/1976 | Steinbach et al. | |
| 4,148,460 A | 4/1979 | Kinsler | |
| 4,198,025 A | 4/1980 | Lowe et al. | |
| 4,589,620 A | 5/1986 | Sakamoto | |
| 4,856,626 A | 8/1989 | Nakanishi | |
| 5,004,206 A | 4/1991 | Anderson | |
| 5,016,673 A | 5/1991 | Carter et al. | |
| 5,169,112 A * | 12/1992 | Boyles | B60N 2/501 248/406.2 |
| 5,234,203 A | 8/1993 | Smith | |
| 5,294,085 A * | 3/1994 | Lloyd | B60N 2/501 248/429 |
| 5,299,906 A | 4/1994 | Stone | |
| 5,367,978 A * | 11/1994 | Mardikian | B60N 2/502 114/363 |
| 5,431,362 A | 7/1995 | Carnahan et al. | |
| 5,558,398 A * | 9/1996 | Santos | A47C 4/54 297/284.3 |
| 5,570,866 A | 11/1996 | Stephens | |
| 6,102,378 A | 8/2000 | Gieseler et al. | |
| 6,135,412 A | 10/2000 | Buehler | |
| 6,202,972 B1 | 3/2001 | Manavi | |
| 6,237,889 B1 * | 5/2001 | Bischoff | B60N 2/0228 180/902 |
| 6,357,830 B1 | 3/2002 | Ratza et al. | |
| 6,648,419 B2 | 11/2003 | Ratza et al. | |
| 6,719,258 B2 * | 4/2004 | Bryngelson | B60N 2/502 248/419 |
| 6,880,483 B2 | 4/2005 | Fedders | |
| 6,880,684 B1 * | 4/2005 | Evans | F16F 9/064 188/313 |
| 6,892,666 B1 | 5/2005 | Plante et al. | |
| 7,124,865 B2 * | 10/2006 | Turner | B60G 17/002 188/322.2 |
| 7,644,663 B2 | 1/2010 | Illesi | |
| 7,950,618 B1 | 5/2011 | Burer | |
| 7,997,600 B2 | 8/2011 | Haller et al. | |
| 8,182,038 B2 | 5/2012 | Haller | |
| 8,265,832 B2 * | 9/2012 | Haller | B62D 33/0608 180/89.13 |
| 8,342,541 B2 * | 1/2013 | Wurmthaler | B60N 2/501 248/636 |
| 8,807,300 B2 * | 8/2014 | Marking | F16F 9/064 138/32 |
| 9,120,410 B2 | 9/2015 | Bauman | |
| 9,707,874 B2 | 7/2017 | Bauman | |
| 2009/0283943 A1 * | 11/2009 | Bordignon | F16F 9/064 267/64.25 |
| 2010/0181708 A1 * | 7/2010 | Kolb | B60G 17/0416 267/113 |
| 2011/0115140 A1 | 5/2011 | Moulik et al. | |
| 2014/0070468 A1 * | 3/2014 | Leonard | B60G 11/27 267/64.27 |
| 2014/0263933 A1 | 9/2014 | Bauman | |
| 2015/0283928 A1 | 10/2015 | Bauman | |
| 2017/0182917 A1 | 6/2017 | Taylor et al. | |

* cited by examiner

SEAT SUSPENSION

CROSS-REFERENCE TO RELATED APPLICATIONS

This application is a divisional of U.S. patent application Ser. No. 14/744,975, filed Jun. 19, 2015, which is a continuation of U.S. patent application Ser. No. 14/213,787, filed Mar. 14, 2014, which issued as U.S. Pat. No. 9,120,410 on Sep. 1, 2015, and which claims priority to U.S. Provisional Application Ser. No. 61/784,659, filed Mar. 14, 2013, each of which is commonly owned and is incorporated herein in its entirety by reference.

TECHNICAL FIELD

The disclosure relates generally to the field of seat suspension. More specifically, the disclosure relates to seat suspensions for seats in boats as well as in cars, trucks, motorcycles, lawnmowers and other vehicles.

BACKGROUND

Riding in a boat is a pleasure to many people. Some ride in boats to enjoy the view as they move through the water. Some, such as those who fish, ride in boats to travel from one place on a body of water to another and wish to ride comfortably. When the water is calm with small or no waves, the ride is relatively smooth. However, when the wind is stronger making the waves larger, the ride can be bumpy and less pleasurable. Various attempts have been made to make the ride in wavy conditions more comfortable.

SUMMARY

While multiple embodiments are disclosed, still other embodiments will become apparent to those skilled in the art from the following detailed description, which shows and describes illustrative embodiments of the disclosure. Accordingly, the drawings and detailed description are to be regarded as illustrative in nature and not restrictive.

While the disclosure is amenable to various modifications and alternative forms, specific embodiments have been shown by way of example in the representative drawings and are described in detail below. The disclosure, however, is not limited to the particular embodiments described or features or details shown in the drawings. On the contrary, the disclosure is intended to cover modifications, equivalents, and alternatives falling within the scope or spirit of the expressed language and drawings.

DETAILED DESCRIPTION

The present disclosure relates to a seat suspension that can have many applications including use with seats on boats, riding lawnmowers, motorcycles, bicycles, trucks, and other vehicles. The following text and corresponding figures illustrate an exemplary embodiment of a suspension used with a boat seat.

FIGS. 1-9 show a boat seat 2, a boat floor 4 and an embodiment of a seat suspension 10 positioned between and connected to seat 2 and floor 4. The suspension 10 includes a seat support portion 12 connected to the boat seat 2, a base portion 14 connectable to the boat floor 4, and a compression assembly 16 positioned between and connected to the seat support portion 12 and the base portion 14. The compression assembly 16 enables relative movements between the seat support portion 12 and the base portion 14 for when, for example, a person sits down onto the seat 2 or when a person is sitting on the boat seat 2 while the boat is riding over and hitting waves on the lake or other body of water.

Figure 1:
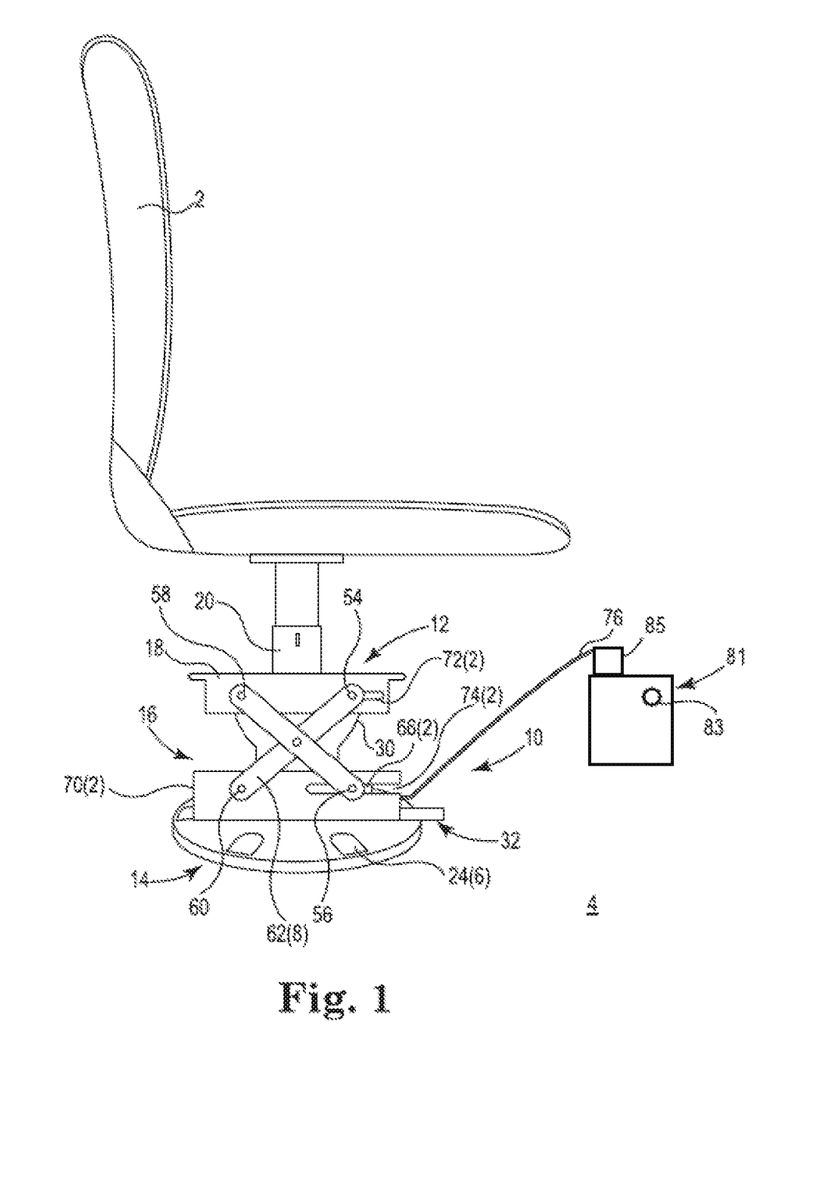
FIG. 1 is a side view of one embodiment.
Figure 2:
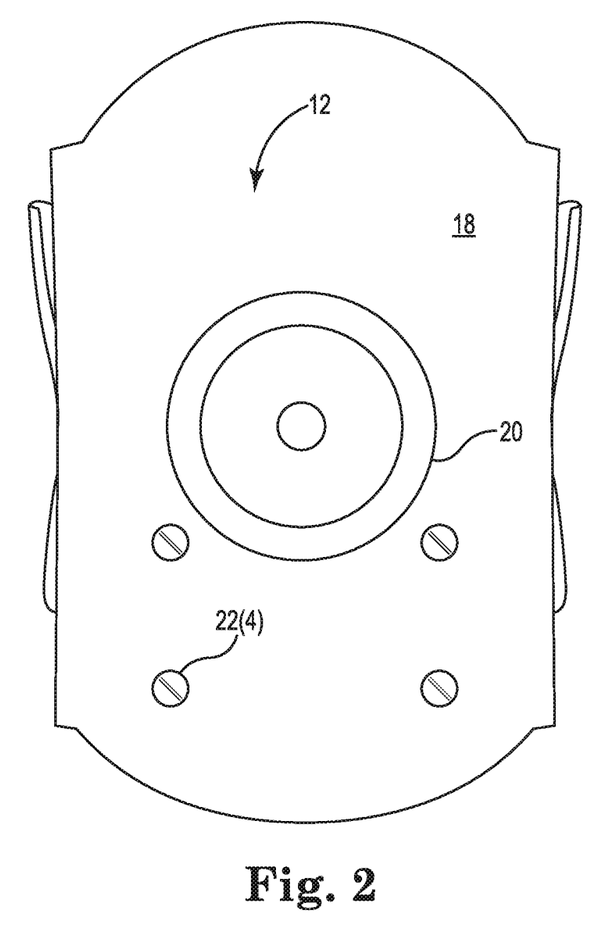
FIG. 2 is a top view of a portion of the embodiment shown in FIG. 1.

The seat support portion 12 includes a top member 18 and a seat stem member 20 that accepts a stem of the boat seat 2. The seat support portion 12 can be made of aluminum and can include a polymeric liner within the seat stem member 20 (not shown) that contacts the stem of the boat seat 2. Top member screws 22 (4) connect the seat support portion 12 to the compression assembly 16.

Figure 3:
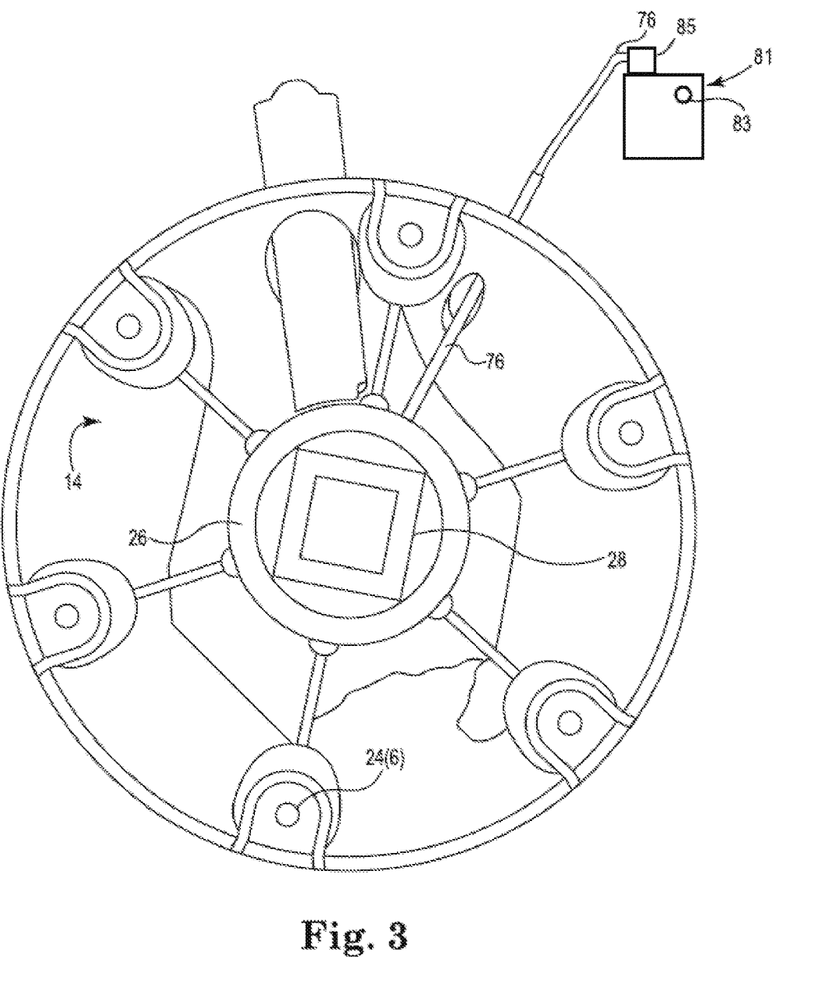
FIG. 3 is a bottom view of a portion of the embodiment shown in FIG. 2.

The base portion 14, which can be cast aluminum, includes six (6) floor attachment locations 24. As shown in FIG. 3, the base portion 14 includes manifold chamber wall 26 and a manifold chamber cover 28 that forms a manifold chamber (not shown).

The compression assembly 16 includes a first fluid container or chamber 30 and a second fluid container or chamber 32. The first fluid chamber 30 is made of a flexible, compressible material and includes an attachment means such as a threaded top hole (not shown) that can receive a screw that passes through the top member 18 of the seat support portion 12 to connect the first fluid chamber 30 to the seat support portion 12. The first fluid chamber 30 is a Mini Lobe Super Cushion, available from Goodyear. A variety of fluids can be used with the first and second chambers, including air, nitrogen, carbon dioxide, other gases, and gas mixtures.

Figures 4, 5, 6:
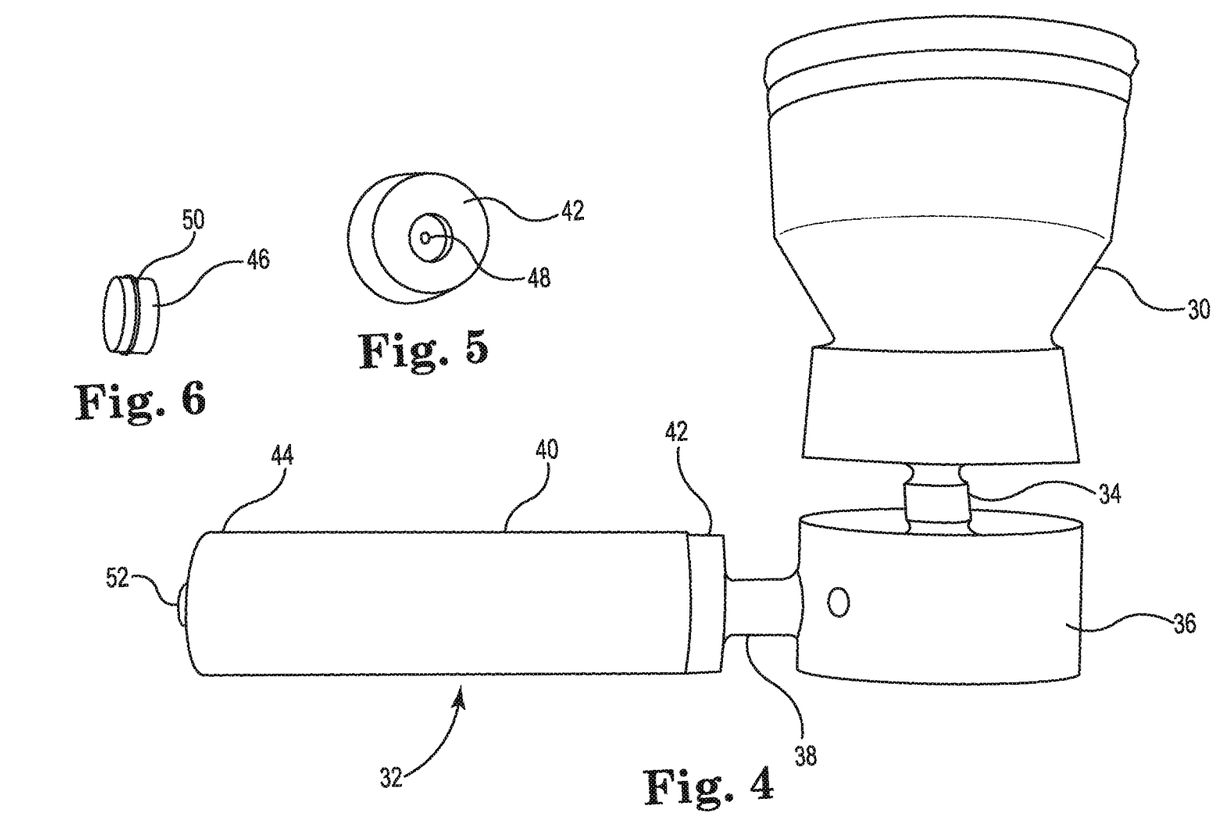
FIG. 4 is a side view of certain components removed from the embodiment shown in FIG. 1 and assembled to shown the connection of the components.
FIG. 5 is a perspective view of one component of the embodiment of FIG. 1.
FIG. 6 is a perspective view of another component of the embodiment of FIG. 1.

As shown in FIG. 4 (which is only intended to shown the connection of certain parts), a first fluid connector 34 has external threads on both ends and is positioned between and in fluid communication with the first fluid chamber 30 and a manifold 36. A second fluid connector 38 has external threads on both ends and is positioned between and in fluid communication with the manifold 36 and the second fluid chamber 32. The second fluid chamber 32, as shown in FIGS. 2-4, includes a main cylindrical, hollow member 40, a front cap or orifice member 42, an end cap 44, and a piston 46 positioned between the front cap 42 and end cap 44 that is movable within the cylindrical interior portion of the second fluid connector 20. The front cap 42 includes internal threads to mate with the external threads of the second fluid connector 38 and includes a through hole or orifice 48 (although the orifice 48 could be within the second fluid connector 38 in which case the front cap 42 would not be included—not shown). The piston 46 can be a disk as shown in FIG. 6, and includes a silicone o-ring 50 within an o-ring groove (not shown). The end cap 44 includes an end cap cover 52. The described connectors 34, 38, second chamber 32, manifold 36, front cap 42, end cap 44, piston 46 can be made be readily fabricated from aluminum, stainless steel or other desired material. Similarly, the dimensions of these components could be different from those shown in the drawings, including for example that the piston 46 could be longer. Also, though not shown, the internal components of the second chamber can be coated, treated or otherwise augmented with a variety of known chemical compounds such as lubricants.

Figure 7:
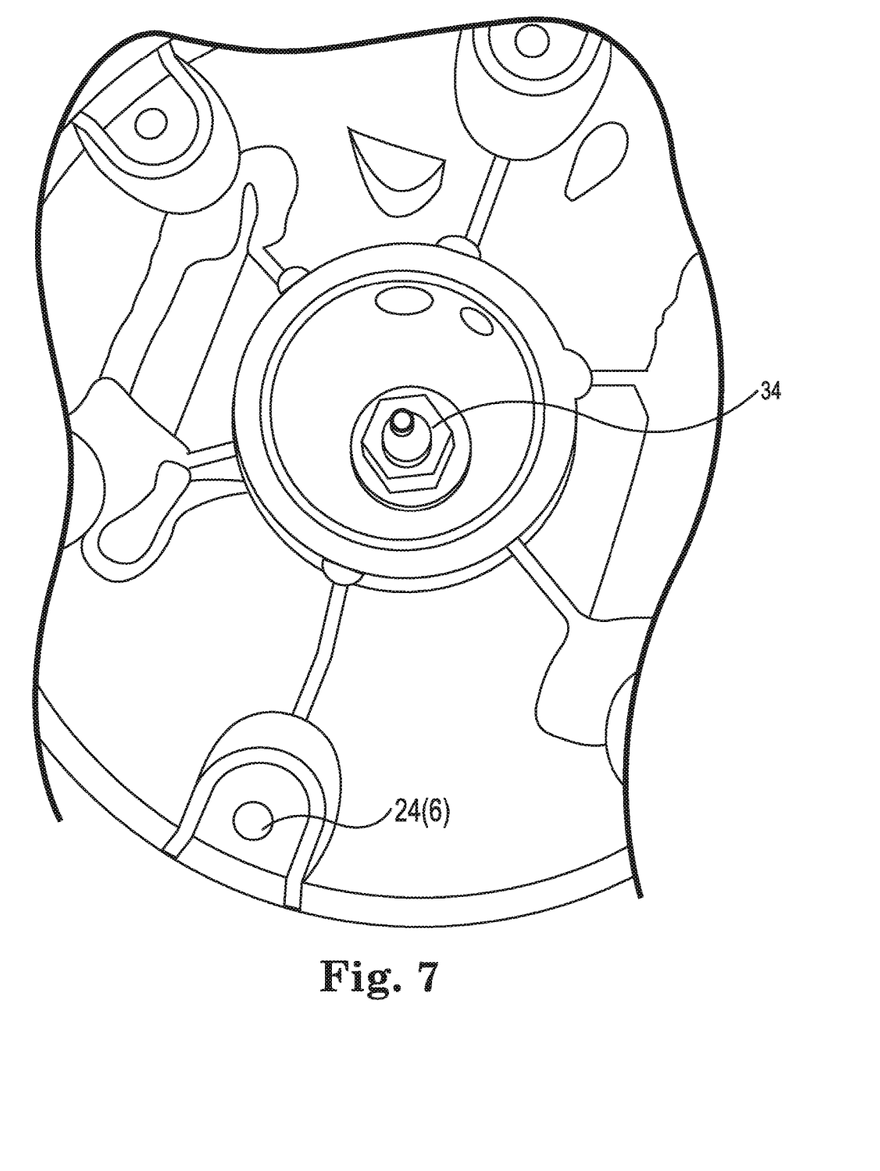
FIG. 7 is a bottom view similar to FIG. 3, but with certain components removed.

FIG. 7 like FIG. 3 shows the underside of the base portion 14, but with the manifold chamber cover 28 removed. A portion of the first fluid connect 34 is viewable within the manifold chamber because manifold chamber cover 28 and the manifold 36 are both removed.

The compression assembly 16 is configured such that a compressive force upon the assembly 16 causes relative movement of the seat support portion 12 toward the base portion 14. This relative movement can occur when, as stated above, when a person sits down onto the seat 2 (seat support portion 12 moves toward base portion 14) or when the boat in which the person is riding hits a wave on the lake or other body of water (base portion 14 moves toward the seat support portion 12). FIG. 1 shows the suspension 10 in a first position in which no compressive force (other than the weight of the seat 2) is being applied to the suspension 10. The magnitude of a compressive force (e.g., sitting down or hitting waves) is a factor in the amount of compression of the suspension 10, that is, how close the seat support portion 12 and the base portion 14 come to one another.

Figure 8:
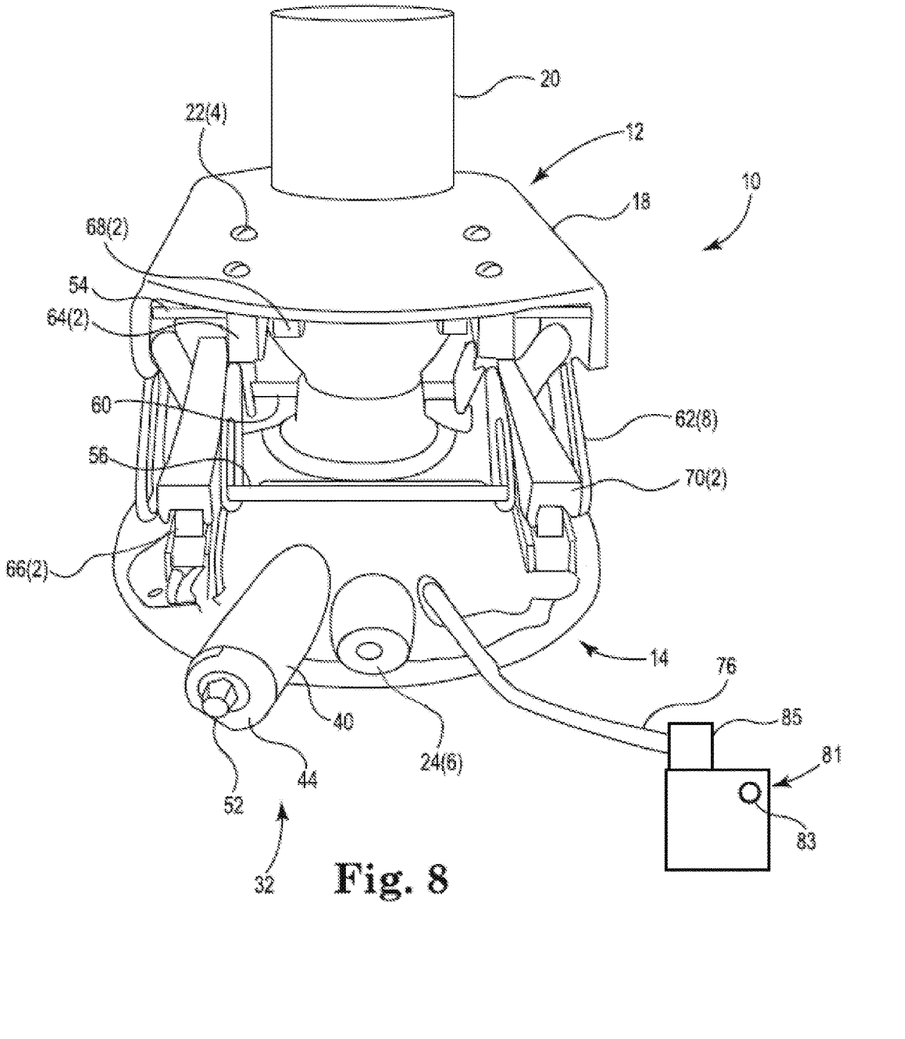
FIG. 8 is a front perspective view of the embodiment shown in FIG. 1.
Figure 9:
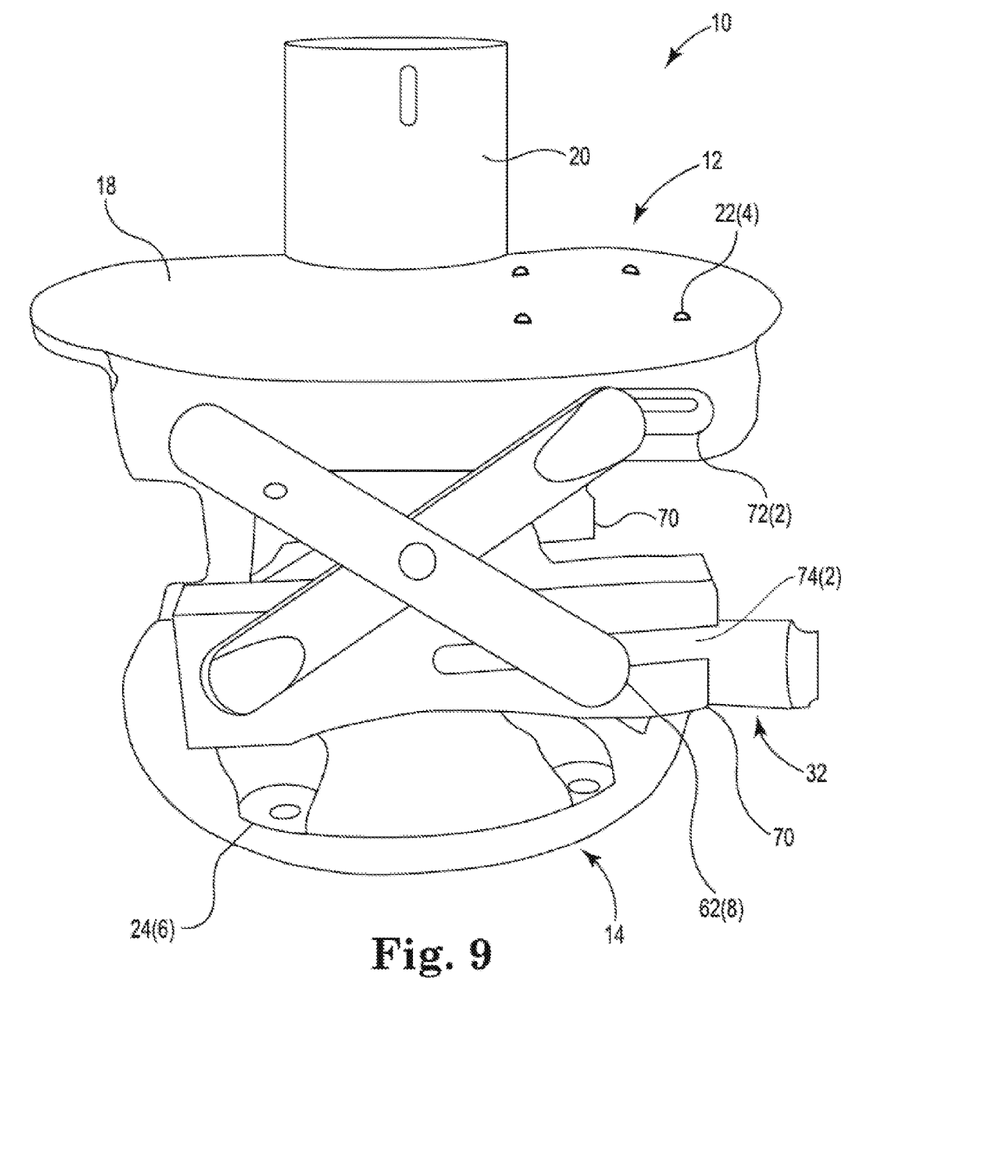
FIG. 9 is a side perspective view of the embodiment shown in FIG. 1.

As shown in FIGS. 1, 8 and 9, the compression assembly 16 further includes a front top support rod 54, a front bottom support rod 56, a rear top support rod 58, and a rear bottom support rod 60. The support rods 54, 56, 58, 60 connect to cross support members 62 (8) and pass through top slide members 64 (2) and bottom slide members 66 (2) and through top rollers 68 (2). The rear top support rod 58 and the rear bottom support rod 60 also pass through and are supported by roller bearings (not shown). The bottom slide members 66 fit within a channel of base support members 70. The above described parts other than the slide members and rollers are either made of aluminum, stainless steel or another desired material. The slide members 64, 66 are rectangular blocks that can be made of a variety of commercially available lubricious materials such as polytetrafluoroethylene or an oil-filled polymer such as nylon. The top rollers 68 are discs that ride on the bottom surface of the top portion 18 of the seat support portion 12. The rollers 68 can be made of a variety of commercially available materials including polymeric materials such as nylon. The rods 54, 56, 58, 60 and the cross support members 62 connect the top member 18 of the seat support portion 12 to base support members 70 (2). The front top support rod 54 passes through top slots 72 (2) of the top member 18. The front bottom support rod 56 passes through bottom slots 74 of the base support members 70.

Figure 13:
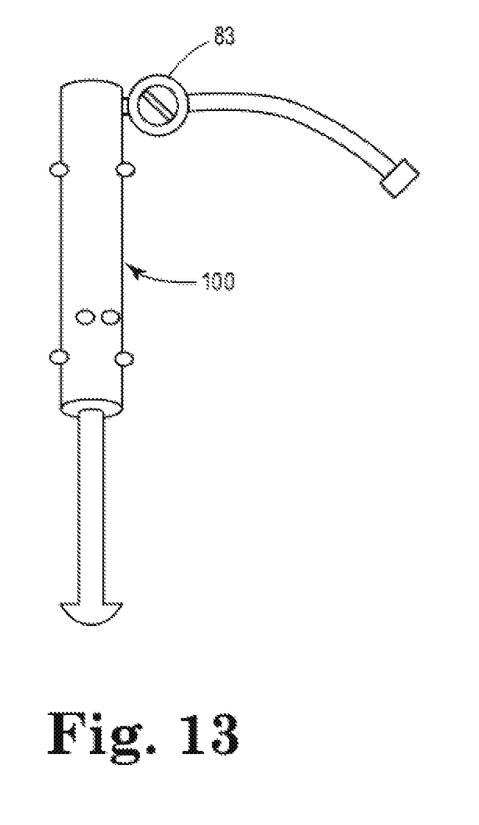
FIG. 13 is a view of a hand pump.

A first fluid conduit 76 is shown in FIGS. 1, 3 and 8. The first conduit 76 connects to the first fluid chamber 30 through a one-way valve (not shown). The first conduit 76 can be connected to a source of fluid such as an electric air compressor 81 (shown schematically) or a hand pump 100 (also known as the manual pump, shown later in FIG. 13). The compressor 81 or hand pump 100 can include a pressure gauge 83 to provide to the person an indication of the pressure in the conduit (and in the first fluid chamber 30 when fluid is being delivered to the first fluid chamber 30). If the compressor 81 is used, a control switch 85 (shown schematically) can be used to engage the compressor 81 and cause fluid to flow into the first chamber 30. The conduit 76, valve, hand pump 100, compressor 81, and control switch 85 are all commercially available components.

Figure 10:
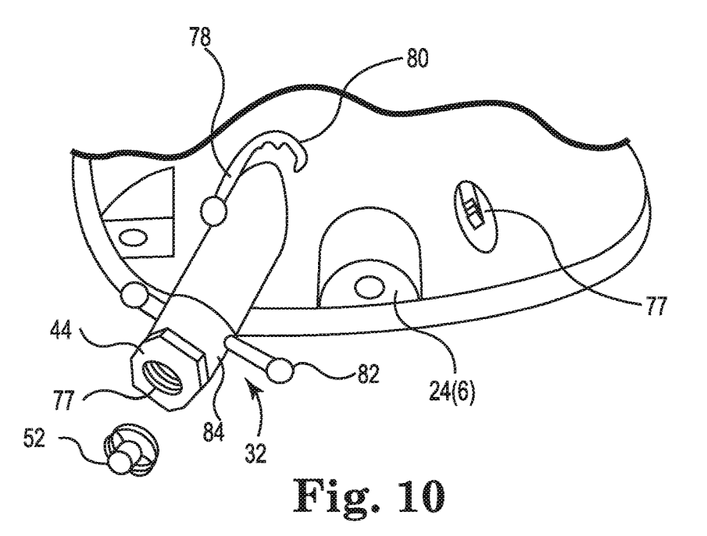
FIG. 10 is a partial front perspective view of an embodiment that is similar to the embodiment shown in FIG. 1.

One approach for using the above described suspension 10 is to charge the first fluid chamber 30 through conduit 76 with a desired first fluid pressure and to charge the second fluid chamber 32 to a desired second fluid pressure. (The second fluid chamber 32, though not shown, can be charged with a conduit 76 and compressor 81 or hand pump 100 like those noted with respect to the first fluid chamber 30. FIG. 10 shows a standard bicycle inflation valve 77 behind the removed end cap 52 which can be connected to the compressor 81 or hand pump 100, and also shows the same valve 77 in place of the conduit 76 shown in FIG. 1.) For example, for a larger person weighing between 220-250 pounds, the first chamber 30 can be charged with between about 40 and 60 pounds per square inch (psi) or about specifically at 50 psi, and the second chamber 32 can be charged with between about 90 and 110 psi or about 100 psi. For a smaller person, one or both pressures can be reduced depending the weight of the person, the boating conditions (or other riding conditions), and the ride preference of the person (bouncier, stiffer, slow or quicker return). For example, one person in a particular riding situation might prefer pressure ranges of 20-40 psi and 60-80 psi for the first chamber 30 and the second chamber 32, respectively. Another person might prefer a range of 35-45 psi and 50-70 psi.

When the first chamber 30 and the second chamber 32 are charged as described above, the higher pressure in the second chamber 32 forces the piston 46 against the front cap 42 of the second chamber 32, that is, to the end toward the first chamber 30 because the piston 46 separates the higher pressure zone, e.g., at 100 psi, from the lower pressure zone, e.g., 50 psi. (Had the higher pressure been charged into the first chamber 30, then the piston 46 would be forced toward the end cap 44 of the second chamber 30 until the fluid between the piston 46 and the end cap 44 has a pressure equal to the pressure on the other side of the piston 46.)

When a person gets onto the boat and sits on the seat 2, the downward force creates an increase in the pressure in the first chamber 30 because the downward force compresses the flexible first chamber 30. The increased pressure depends on the weight of the person. If the increased pressure in the first chamber 30 does not exceed the pressure in the second chamber 32, the piston 46 will remain at the end of the second chamber 32 against the front cap 42.

When the boat is moving and hitting waves, hitting a wave creates a larger compressive force on the suspension 10 than the force caused only by the weight of the person. If the resulting pressure within the first chamber 30 resulting from hitting the wave remains less than the pressure in the second chamber 32, then the compression of the flexible first chamber 30 absorbs the force of the wave. If however the resulting pressure within the first chamber 30 resulting from hitting the waves exceeds the pressure in the second chamber 32, then fluid in the first chamber 30 will flow through the orifice 48 and force the piston 46 toward the end cap 44 of the second chamber 32 until the pressure in the second chamber 32 equals the increased pressure in the first chamber 30.

After hitting the wave, the downward force on the suspension 10 returns to the weight of the person or less that the weight when the person is forced upward due to the wave such that less than the person's weight is applied to the suspension 10. This causes the higher pressure on the second chamber side of the piston 46 to move the piston back to the end of the second chamber 32 against the front cap 42. Fluid is forced by the movement of the piston 46 through the orifice 48. The size of the orifice determines the rate at which the piston will move toward the front cap 42 (and return to being against the front cap 42 when the pressure in the second chamber 32 exceeds the pressure in the first chamber 30).

An orifice diameter of three thirty-seconds of an inch (3/32") has been found to provide an acceptably comfortable ride for a person of about 230 pounds riding in wavy conditions with the pressure in first chamber 30 charged to 50 psi and the pressure in the second chamber 32 charged to 100 psi (i.e., charged prior to the ride). For less wavy conditions (size of and distance between waves), the pressure in one or both of the first chamber 30 and the second chamber 32 can be reduced. For example, in less wavy conditions, the 230-pound person could reduce the pressure in the first chamber 30 from about 50 psi to about 45 psi or about 40 psi or even lower (using for example the previously noted compressor control). That is, a person could reduce that pressure by about 10% or about 20% or even more. Likewise, in even wavy conditions, a person can decide to increase the pressure in one or both of the chambers, for example, charge the first chamber 30 to a higher pressure, such as about 10% higher, 20% higher or even higher.

Figure 11:
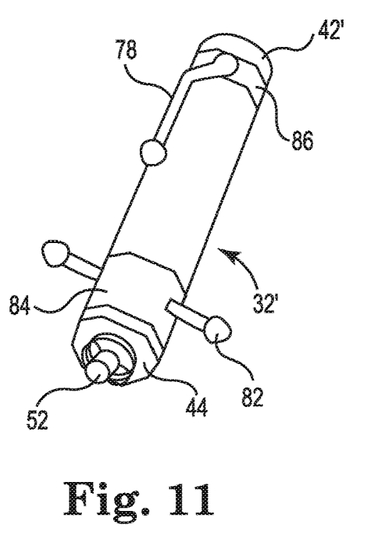
FIG. 11 is perspective view of certain components of the embodiment shown in FIG. 10.
Figure 12:
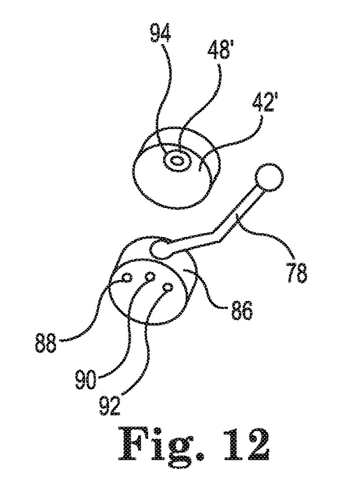
FIG. 12 is perspective view of two components of the embodiment shown in FIG. 10.

Additional control of the suspension 10 can be provided by the structure shown in FIGS. 10-12. A variation of the second fluid chamber 32' includes a first adjustment arm 78 that passes through adjustment slot 80 in the base portion 14. This embodiment also includes a second double-knobbed adjustment arm 82 connected to mid chamber member 84. The first adjustment arm 78 is attached to a multi-orifice member 86 having a first orifice 88, a second orifice 90, and a third orifice 92 of increasing sizes, for example, 2/32", 3/32" and 4/32" respectively. The multi-orifice member 86 is connected to and rotatable relative to a variation of the front cap 42' (also known as the orifice member 42'), that has a variation of the main orifice 48' and an o-ring 94 around the main orifice 48'. The main orifice 48' has a diameter at least as larger as the diameter of the biggest orifice, i.e., 4/32". One or both of the arms 78, 82 can be turned to rotate the multi-orifice member 86 relative to the front cap 42' such that the main orifice 48' and its o-ring 92 align with and allow fluid to flow through one of the three orifices 88, 90, 92. The adjustment slot 80 limits the rotation of the multi-orifice member 86 such that the left end of the slot 86 causes the main orifice 48' to align with third orifice 92 (furthest to the right of the three orifices). The right end of the slot 80 causes the main orifice 48' to align with the first orifice 88 (furthest to the left of the three orifices). When the first adjustment arm 78 is moved into a middle notch in the slot 80, then the main orifice 48' is aligned with the second orifice 90. The person can select the orifice size to adjust the ride to suit him or her. A different number of orifices could be used and different means for selecting the desired orifice are contemplated, including having a longer adjustment arm that extends upwardly toward the top of the seat to reduce or eliminate the need for a person in the seat to bend down to make the adjustment, like the hand emergency brake lever in some automobiles. (FIG. 12 shows the multi-orifice member 86 oriented opposite to its position in FIG. 11 to show the three orifices.)

In addition, means for changing the diameter of a single orifice are contemplated such as using a compressible material through which the orifice is formed and a mechanism that adjustably constricts the orifice to reduce the diameter of the orifice to the desired length. Similar, it is contemplated that the various means for carrying out particular functions using structures described herein could be carried out with structures other than or in addition to those described.

An example of another structure for providing the described functions is an embodiment in which the previously described compressible first fluid chamber 30 is replaced by an incompressible chamber formed by the cylindrical stem portion of the seat support portion 12 that is closed by the stem of the seat 2, which serves as the piston within the cylindrical stem portion. The piston stem can include an air seal, such as with an o-ring or other means for sealing. The piston stem can slide up and down into the first incompressible fluid chamber with the o-ring seal retaining fluid, for example, air between the piston and the stem portion of the seat support portion 12. The first incompressible chamber can be charged like the first chamber 30 and can be configured to work with the second chamber 32. This approach would include having a structure that prevents the seat and its piston stem from separating from the incompressible chamber, i.e., a stop, so that the pressure within the first chamber is prevented from separating the piston stem of the seat with the stem portion of the seat support portion 12.

Another embodiment involves the use of one or more relief valves (not shown) to release fluid from one or both of the first chamber 30 and second chamber 32. The relief valves could be commercially available one way valves that are set or selected to open when the pressure in the chamber exceeds a desired maximum pressure. This approach could be used to prevent or reduce the chance of damaging the chamber when pressure therein is excessive.

Another embodiment could include a third fluid chamber (not shown) that is similar to the second fluid chamber 32 and that is connected to the first chamber 30 or the second chamber 32. The third chamber could be charged at a different pressure than the pressure in the first chamber 30 and the second chamber 32, such as a higher pressure than either of the first chamber 30 or the second chamber 32 such that the piston in the third chamber would not move until pressure in the first chamber 30 reaches a level that exceeds the pressure to which the third chamber is charged.

Another embodiment is shown in FIGS. 14-18. Second chamber 32" is similar to previously described second chamber 32 including its cylindrical shape and piston (not shown). A difference in this embodiment is the use of modified or additional components compared to those in previously described second chamber 32, e.g., components 38", 110, 112 and 114 shown in FIG. 14. FIGS. 15-18 provide more detail regarding these components.

Figures 14, 15, 16, 17, 18:
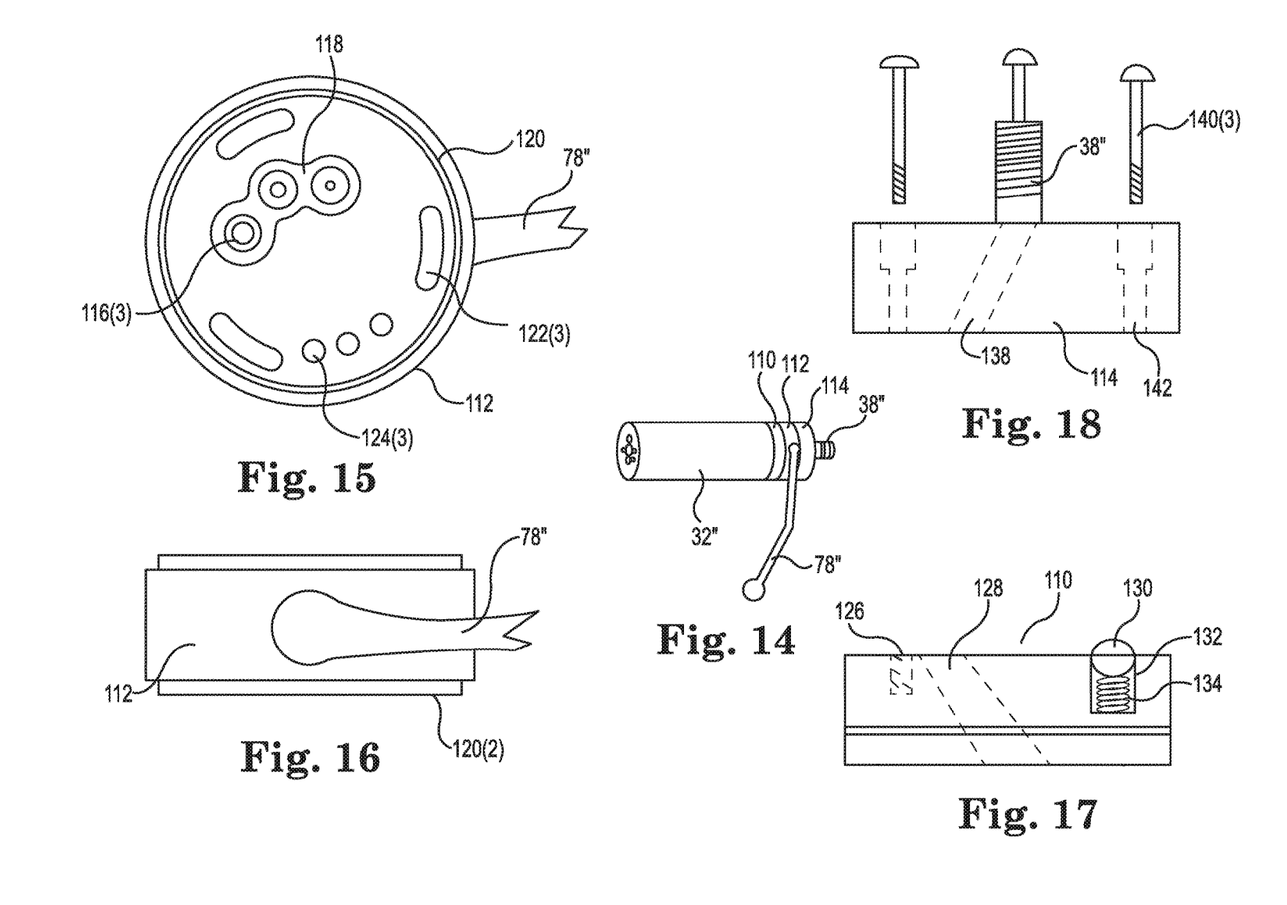
FIG. 14 is a perspective view of an alternative embodiment of an assembly.
FIG. 15 is a top view of one part of the assembly shown in FIG. 14.
FIG. 16 is a side view of the part of the assembly shown in FIG. 15.
FIG. 17 is a side view of another part of the assembly shown in FIG. 14.
FIG. 18 is a side view of another part of the assembly shown in FIG. 14.

As seen in FIGS. 15 and 16, orifice plate 112 includes, as an example, three (3) orifices 116 of different sizes, though more or fewer orifices could be used. The three orifices 116 are surrounded by a sealing member 118. Member 118 is thin and flat and made of a compressible material such as silicone or polyester. It aids in maintaining the fluid flow through the orifices 116 when the orifice plate 112 is rotated to select the desired orifice of the three. It is similar to engine gaskets.

Plate 112 also includes two o-rings 120, three through slots 122, three detents 124, and adjustment arm 78". One of the o-rings 120 is located on each side to provide a seal with detent plate 110 and front plate 114. The through slots 122 are provided to work with three connection bolts 140 (shown in FIG. 18 and described further below) to connect the detent plate 110, orifice plate 112 and front plate 114. The curved shape of the slots 112 enables rotation of the orifice plate 112 relative to the detent plate 110 and front plate 114. Three detents 124 are slight depressions that are positioned and configured to work with the detent ball 130, ball well 132, and ball spring 134 (shown in FIG. 17 and described further below). Detents 124 are slight depressions with a partial spherical shape to correspond to the shape of the ball 130. Each of the detents 124 corresponds with one of the orifices 116.

FIG. 17 shows details of the detent plate 110. As previously noted, this plate 110 includes detent ball 130, ball well 132 and ball spring 134, as well as three (3) threaded bolt holes 126 (only one of which is shown), and a channel 128. The spring 134 is a common coil spring that rests within the ball well 132 and biases the ball upwardly with a desired force. The ball 130 is similar to the ball of a ball bearing. The ball well 132 has a main diameter sized to enable the movement of the ball 130 within the ball well 132. The ball well 132 has a smaller entrance diameter (not shown) that forms a lip that is smaller than the diameter of the ball 130 such that the ball 130 is retained in but partially protrudes from the ball well 132. The detent ball 130, ball well 132, spring 134 and the detents 124 provide the function of holding the orifice plate 112 in place by holding the ball 130 in one of the detents 124 until a sufficient rotational force is applied to the orifice plate 112, e.g., to the adjustment arm 78", when the user wishes to change to a different orifice.

FIG. 18 shows details of the front plate 114. This plate 114 connects to the second fluid connector 38" which is described in more detail below. As previously noted, this plate 114 includes connection bolts 140. These bolts 140 fit into corresponding unthreaded bolt holes 142 (only two of the three holes 142 are shown), slots 122 in orifice plate 112, and threaded holes 126 in the detent plate 110. The threads of bolts 140 mate with the threads of holes 126 to hold together the noted plates 110, 112, 114.

Regarding second fluid connector 38", though not shown in FIGS. 14-18, this connector is similar to previously described second fluid_connector 38. It includes an internal channel that communicates with channel 138 in plate 114. The channel in second fluid connector 38" includes a section in which the diameter of the channel gradually (or conically) decreases from a first larger diameter to a second smaller diameter. The diameter decreases in the direction toward the piston in second chamber 32". In addition to this conical decrease in a diameter, the second fluid connector 38" includes a less gradual increase in diameter (closer to the piston than the gradual conical decrease in diameter). That is, the less gradual increase in diameter can be conical but at a sharper angle or can have immediate change in diameter (i.e., no conical shape, perpendicular or near perpendicular to the direction of the channel).

In another embodiment, a flexible fluid hose (not shown) could be used to connect the second chamber 32" to second fluid connector 38". The flexibility of this hose would allow the second chamber 32" to move relative to the remainder of the structure.

A further embodiment involves the use of an adjustable single flow channel rather than the use of multiple orifices (not shown). For example, a needle valve or other known fluid flow control valves could be used to enable greater or lesser flow rate by opening the valve's port to greater or lesser degrees (i.e., closed, partially opened, fully opened), just like switching to a larger or smaller orifice, respectively. Needle valves are available from Grainger (www.grainger.com).

A variety of other fluid flow valves could be used as could combinations of valves (not shown). For example two one-way valves could be used, with the first one allowing flow in a direction opposite to the direction allowed by the second. The first one-way valve could allow flow at one rate (e.g., volumetric flow rate) and the second one-way valve could all flow at a different rate or at the same rate (i.e., one or both valves could be adjustable). These could be used to further adjust the use or performance of the suspension 10 (i.e., for different riders and/or different riding conditions). Commercially available duckbill valves are one such one-way valves.

Another embodiment includes the use of a bag or other cover over any of the previously described structures (not shown). Such cover provides a barrier that prevent or reduces the chance of a user or other person from getting pinched by any portion of the structure when moving due to compression of the suspension 10. Similarly, it prevents or reduces the possibility of interference of the movement of the suspension 10 by any adjacent objects, such as fishing poles, paddles, towels or other items often found in boats.

Various other embodiments are contemplated, and modifications, permutations and additions can be made to the exemplary embodiments discussed above without departing from the scope and spirit of the present disclosure. For example, while the embodiments described above refer to particular features, the scope of this disclosure also includes embodiments having different combinations of features and embodiments that do not include all of the described features. Further, many features described or shown as being part of various components could be part of other components that provide similar results. Further, the described structure should be considered means for providing desired functions. Accordingly, the scope of the present disclosure is intended to embrace all such alternatives, modifications, and variations as fall within the scope of included or later provided claims, together with all equivalents thereof.

The following is claimed:

1. A seat suspension, comprising:
  a seat support portion;
  a base; and
  a suspension assembly positioned between the seat support portion and the base, the suspension assembly permitting relative movement between the seat support portion and the base, the suspension assembly including:

a compressible cushion for containing a gas; and
a chamber including:
a cylindrical hollow member;
a front cap at one end of the cylindrical hollow member, the front cap including an orifice, wherein the orifice provides fluid communication between the cushion and the chamber;
an end cap at another end of the cylindrical hollow member; and
a piston positioned within the cylindrical hollow member between the front cap and the end cap;
wherein when a compressive force causes movement of the seat support portion towards the base, thereby compressing the cushion, the gas from the cushion flows through the orifice into the chamber and directly forces movement of the piston away from the front cap.

2. The seat suspension of claim 1, wherein the orifice is a main orifice and the chamber further includes a multi-orifice member, the multi-orifice member including a first orifice having a first orifice size, and a second orifice having a second orifice size that is different from the first orifice size, and wherein the suspension assembly is adjustable such that the gas flows between the cushion and the chamber through the main orifice and one of the first orifice and the second orifice.

3. The seat suspension of claim 2, wherein the multi-orifice member includes a third orifice having a third orifice size that is different from the first orifice size and the second orifice size, and wherein the suspension assembly is adjustable such that fluid flows between the cushion and the chamber through the main orifice and one of the first orifice, the second orifice and the third orifice.

4. The seat suspension of claim 1, wherein the piston separates an interior of the chamber into a first portion and a second portion, and wherein the first portion has a first volume and the second portion has a second volume, wherein the second portion of the chamber is closed by the end cap such that movement of the piston within the chamber that reduces the second volume of the second portion compresses fluid within the second portion.

5. The seat suspension of claim 4, wherein the chamber further includes a valve to which a fluid source can be connected, the valve in fluid communication with the second portion of the chamber.

6. The seat suspension of claim 5, wherein the fluid source includes a manual pump.

7. The seat suspension of claim 1, wherein the suspension assembly further comprises a fluid conduit in fluid communication with the cushion.

8. The seat suspension of claim 7, wherein the suspension assembly further comprises a compressor and a control mechanism, wherein the compressor is a fluid source connected to the fluid conduit, and wherein the control mechanism is configured to enable the compressor to provide fluid to the cushion.

9. The seat suspension of claim 1, further comprising a manifold in fluid communication with and positioned between the cushion and the chamber.

10. The seat suspension of claim 1, wherein the gas includes air.

11. A seat suspension, comprising:
a seat support portion;
a base; and
a suspension assembly positioned between the seat support portion and the base, the suspension assembly permitting relative movement between the seat support portion and the base, the suspension assembly including:
a compressible cushion for containing a gas; and
a second gas container in fluid communication with the compressible cushion, the second gas container including:
a hollow member;
an orifice member having an orifice that provides the fluid communication between the compressible cushion and the second gas container; and
a moveable member positioned within the hollow member, wherein a downward compressive force on the seat support portion causes movement of the seat support portion towards the base, thereby compressing the cushion and causing gas in the cushion to flow through the orifice into the hollow member and move the moveable member away from the orifice.

12. The seat suspension of claim 11, wherein the hollow member has a cylindrical shape and an inside diameter, and wherein the moveable member has an outside diameter that is less than the inside diameter.

13. The seat suspension of claim 12, wherein the moveable member is a piston having a cylindrical shape.

14. A seat assembly comprising:
the seat suspension of claim 11; and
a seat connected to the seat support portion of the seat suspension.

15. A seat suspension, comprising:
a seat support portion;
a base; and
a suspension assembly positioned between the seat support portion and the base, the suspension assembly permitting relative movement between the seat support portion and the base, the suspension assembly including:
a compressible cushion for containing a gas; and
a second gas container in fluid communication with the compressible cushion, the second gas container including:
a hollow cylinder;
an orifice member having an orifice that provides the fluid communication between the compressible cushion and the second gas container; and
a moveable component positioned within the hollow cylinder, wherein a downward compressive force on the seat support portion causes movement of the seat support portion towards the base, thereby compressing the cushion and causing gas in the cushion to flow through the orifice into the hollow cylinder and move the moveable component away from the orifice.

16. The seat suspension of claim 15, wherein the moveable component includes a disk, the hollow cylinder has an inside diameter, and the disk has an outside diameter that is less than the inside diameter of the hollow cylinder.

17. The seat suspension of claim 15, wherein the moveable component includes an O-ring disposed at the outside diameter of the moveable component.

18. The seat suspension of claim 15, wherein the hollow cylinder further includes a valve to which a fluid source can be connected, the valve in fluid communication with the hollow cylinder to enable pressurization of the hollow cylinder.

19. The seat suspension of claim 18, wherein the fluid source includes a manual pump.

20. The seat suspension of claim 15, further comprising a manifold in fluid communication with and positioned between the cushion and the hollow cylinder.

* * * * *